F. NIELSEN.
PIPE COUPLING.
APPLICATION FILED APR. 15, 1910.
1,001,069.
Patented Aug. 22, 1911.
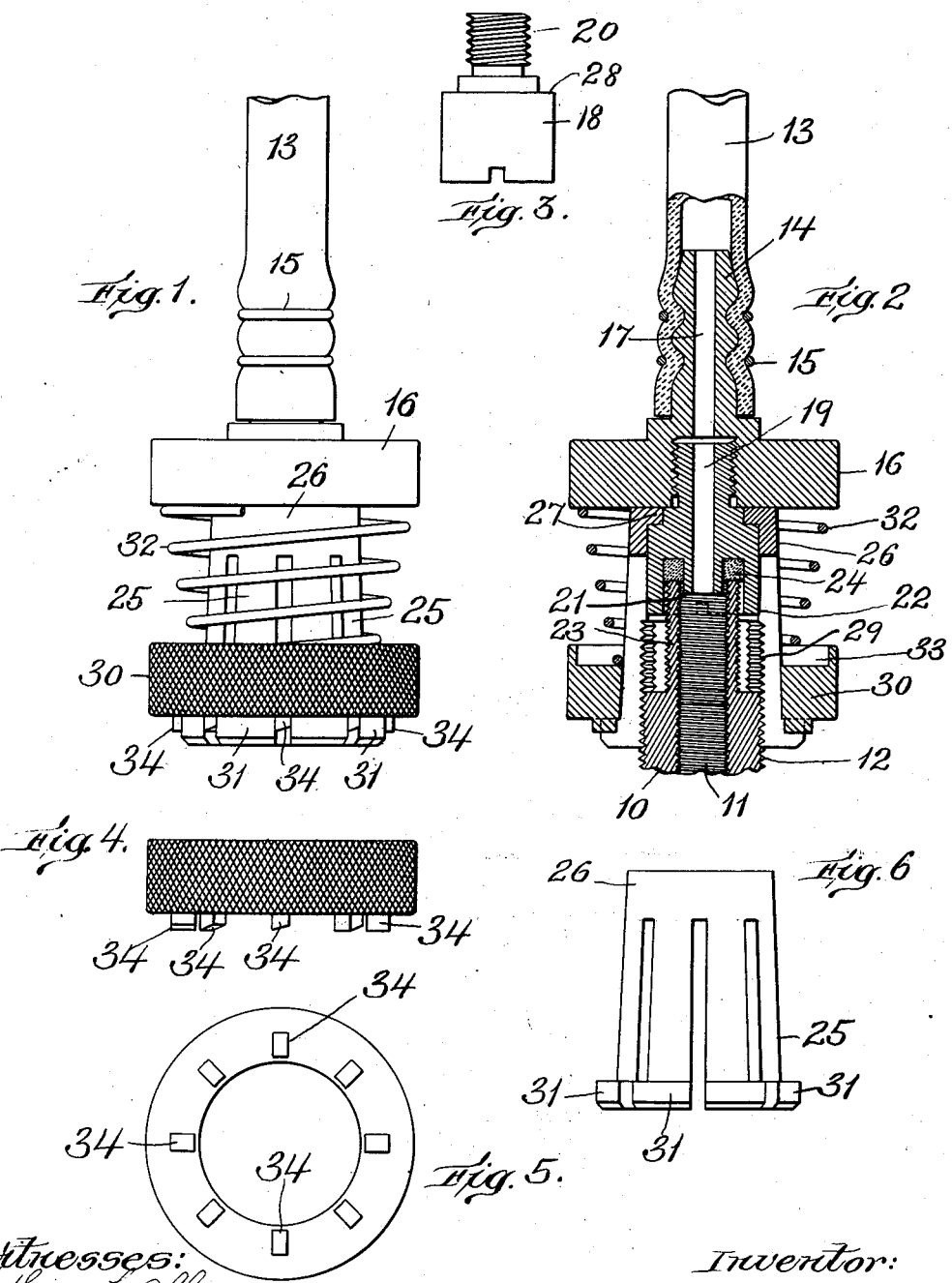
Witnesses:
Harry L. Allen
Inventor:
Frederik Nielsen,

UNITED STATES PATENT OFFICE.

FREDERIK NIELSEN, OF BOSTON, MASSACHUSETTS.

PIPE-COUPLING.

1,001,069.

Specification of Letters Patent. Patented Aug. 22, 1911.

Application filed April 15, 1910. Serial No. 555,628.

*To all whom it may concern:*

Be it known that I, FREDERIK NIELSEN, of Boston, in the county of Suffolk and State of Massachusetts, have invented certain new and useful Improvements in Pipe-Couplings, of which the following is a specification.

This invention relates to pipe couplings and especially to couplings adapted to couple a flexible pipe to the valve stem of a pneumatic tire whereby the tire may be connected with a pump or reservoir containing compressed air.

The greater proportion, if not all, of the valve stems of pneumatic tires now in use are externally threaded to receive clamping nuts for clamping them in the rim of a wheel. There are several different forms of coupling members for connecting a rubber pipe to the valve stem of a tire, one of such forms being a coupling member having a circular series of resilient tongues adapted to slip over the end of the valve stem and adapted to be compressed to engage the exterior thread of the valve stem, said spring tongues being usually provided with internal screw threads adapted to coact with the exterior screw threads of the valve stem.

To this type of coupling member the present invention relates, and the chief object of the invention is to increase the utility of a coupling of this type and to provide a means of protecting the free ends of the spring tongues from becoming damaged as the result of abuse.

The greater proportion of fireproof buildings in which motor cars are stored and repaired are constructed with granolithic or concrete floors. The natural tendency of a person after uncoupling the flexible pipe of a pump, and not wishing to use the pump again, is to throw it aside, letting it drop upon the floor. The spring tongues of the coupling member should be treated with enough care to avoid burring or bending their free ends, but when the coupling is dropped upon a hard floor composed of abrasive material so that the ends of the tongues may strike the floor, the tongues soon become rendered unfit for use and the coupling is destroyed. The present invention provides a means whereby this liability to destruction is prevented, the protecting means having the form of a collar of relatively large diameter surrounding the resilient tongues and a spring adapted to force the collar to the ends of the tongues so that when the coupling is cast aside the collar will immediately spring into such position as to prevent the ends of the tongues from striking the floor in a way which would result in their damage. The collar which thus serves to protect the tongues serves also to compress the tongues into closed position, and in addition to these functions it may be used for the purpose of rotating the tongues after the latter have been compressed upon the exterior thread of the valve stem. The object in rotating the tongues after having compressed them is to make the coupling tight after having attached it to the valve stem.

Of the accompanying drawings which illustrate one form in which the invention may be embodied, Figure 1 represents an elevation of the coupling in its normal condition, said coupling being adapted for engagement with the valve stem of a pneumatic tire. Fig. 2 represents a longitudinal section of the coupling as applied to a valve stem. Fig. 3 represents an elevation of one of the members of the coupling detached. Fig. 4 represents a side elevation of the sliding collar by which the tongues are compressed, protected, and rotated. Fig. 5 represents an end elevation of said collar. Fig. 6 represents a side elevation of a member composed of a plurality of resilient tongues.

The same reference characters indicate the same parts wherever they occur.

Referring first to Fig. 2, a valve stem such as that attached to a pneumatic tire is indicated at 10. Said stem is composed of metal and has a central longitudinal bore 11 through which air is forced to inflate the tire (not shown). The bore 11 is usually threaded to receive a check valve (not shown), and the exterior of the valve stem is usually provided with a screw thread 12 to receive one or more nuts by which the stem is clamped in the rim of a wheel. 13 indicates a flexible pipe such as a rubber hose, through which air under pressure is delivered to the valve stem. As shown by the drawings the pipe 13 is clamped upon the exterior of a nipple 14 by rings or wires 15. The nipple 14 extends from a flange 16 and is formed with a longitudinal central bore 17. A connecting piece 18 having a longitudinal bore 19 and an exterior screw thread 20 is threaded into the flange 16. The outer end of the connecting piece 18 is preferably formed with two concentric annular flanges 21 and 22 between which is a groove adapted to receive the reduced end 23 of the valve stem 10. A washer 24 of resilient material such as rubber is seated in the connecting member 18 between the flanges 21 and 22 in a position to act as a seat for the end of the reduced portion 23.

The connecting member 18 is coupled to the valve stem 10 by a plurality of resilient tongues 25 which as shown by Fig. 6 form integral parts of a sleeve or thimble 26. The inner end of the thimble is formed with an internal flange 27 which surrounds the connecting member 18 between a shoulder 28 on said connecting member and the flange 16. The sleeve 26 is free to rotate with relation to the members 16 and 18. The exterior surfaces of the tongues 25 are divergent and the interior surfaces are formed with screw threads 29 which are adapted to coact with the external thread 12 when the tongues 25 are compressed. The tongues 25 in their normal position open sufficiently to enable them to be slipped on or off the body of the valve stem.

The tongues 25 are surrounded by a collar 30 of relatively great external diameter. The interior surface of the collar is of such diameter as to compress the tongues upon the thread 12 when the collar is at the free ends of the tongues and to permit the tongues to spring apart when the collar is moved toward the flange 16. The ends of the tongues 25 are provided with external ribs or flanges 31 by which the compressing movement of the collar is limited. A spiral spring 32 surrounding the tongues and compressed between the flange 16 and the collar 30 is adapted to normally force the collar to the flanges 31 when the tongues are free to be closed. The collar is preferably formed with a recess 33 to receive the convolutions of the spring when the latter is compressed. The spring is preferably made in the form illustrated so that when compressed the movement of the collar will not be limited thereby.

When the coupling is to be attached to the valve stem the collar 30 is first retracted toward the flange 16 in order to permit the spring tongues to open. While the collar is held in retracted position the spring tongues are slipped over the end of the valve stem sufficiently to seat the washer 24 upon the reduced end 23. The collar 30 is then released and is forced by the spring 32 toward the free ends of the tongues. The tongues thus become automatically engaged with the screw thread 12 but complete closure of the tongues may be retarded by the thread 12 so that it is necessary to apply manual force in order to move the collar 30 quite as far as the flanges 31. It is apparent that no manipulation other than simply releasing the hold upon the collar 30 is necessary to effect connection between the tongues and the valve stem, the tongues being automatically connected by the action of the spring 32. The user may therefore give his sole attention to the pressure upon the flange 16 to insure tight seating of the washer 24 upon the reduced end 23. As before stated, if the tongues do not completely close under the tension of the spring 32 additional tension may be applied manually.

In order to detach the coupling it is necessary to merely retract the collar 30 against the tension of the spring 32, the tongues 25 automatically springing open and releasing the thread 12, so that the tension which compresses the spring 32 later withdraws the coupling from the valve stem. If the coupling is now cast aside the collar 30 is immediately projected to the free ends of the tongues in position to protect the tongues when the coupling strikes the floor.

It is sometimes desirable to rotate the coupling slightly after having completed connection with the valve stem for the purpose of further tightening the connection. It is, however, desirable to avoid rotating the connecting member 18 in which the resilient seat 24 is contained in order to avoid friction due to the rubbing of the seat upon the reduced end 23. For this reason the outer end of the collar 30 is provided with teeth 34 which are adapted to enter the spaces between the ends of the flanges 31 when the collar 30 is at the limit of its compressing movement. The overlapping of the teeth 34 and flanges 31 is illustrated by Figs. 1 and 2. The end faces of the teeth are preferably inclined as shown by Figs. 1 and 4 to facilitate the entrance of the teeth into the spaces when the collar is rotated to the right as required in order to tighten the connection. If, when the collar 30 is released after having been retracted, the teeth 34 do not register with the spaces between the flanges 31 a slight rotation will always be sufficient to move the teeth into register with the spaces, and they will be automatically projected into position without requiring any special effort on the part of the user. The relatively large diameter of the collar 30 affords a convenient grip to facilitate the rotation of the collar. It is apparent that the teeth 34 cannot come into contact with the floor under any circumstances whether they be inserted between the flanges 31 or whether they engage the rear faces of said flanges.

Having thus explained the nature of my said invention and described a way of constructing and using the same, although without attempting to set forth all of the forms in which it may be made or all of the modes of its use, what I claim is:—

1. A coupling for an externally threaded pipe, comprising a conduit member, a circular series of normally open internally threaded resilient tongues adapted to slip over the end of said threaded pipe, said tongues extending from said conduit member and having diverging outer surfaces, a collar engaging said outer surfaces and adapted to slide thereon to compress said tongues, and separable coactive means on said collar and tongues adapted to be interlocked against relative rotation when the collar is in compressing position.

2. A coupling comprising a member provided with a plurality of complemental resilient tongues having internal gripping surfaces and externally diverging surfaces, the free ends of said tongues being normally open beyond the diameter of the member to be gripped thereby, a collar adapted to slide upon said tongues to compress the same, outwardly projecting members at the free ends of the tongues, one end of said collar being provided with longitudinal faces adapted to move into and out of engagement with the projections at the free ends of said tongues when the collar is in compressing position.

In testimony whereof I have affixed my signature, in presence of two witnesses.

FREDERIK NIELSEN.

Witnesses:
W. P. ABELL,
P. W. PEZZETTI.